June 25, 1963    R. A. DENTON ETAL    3,095,494
ULTRA HIGH VACUUM DEVICE
Filed Feb. 25, 1960    2 Sheets-Sheet 1
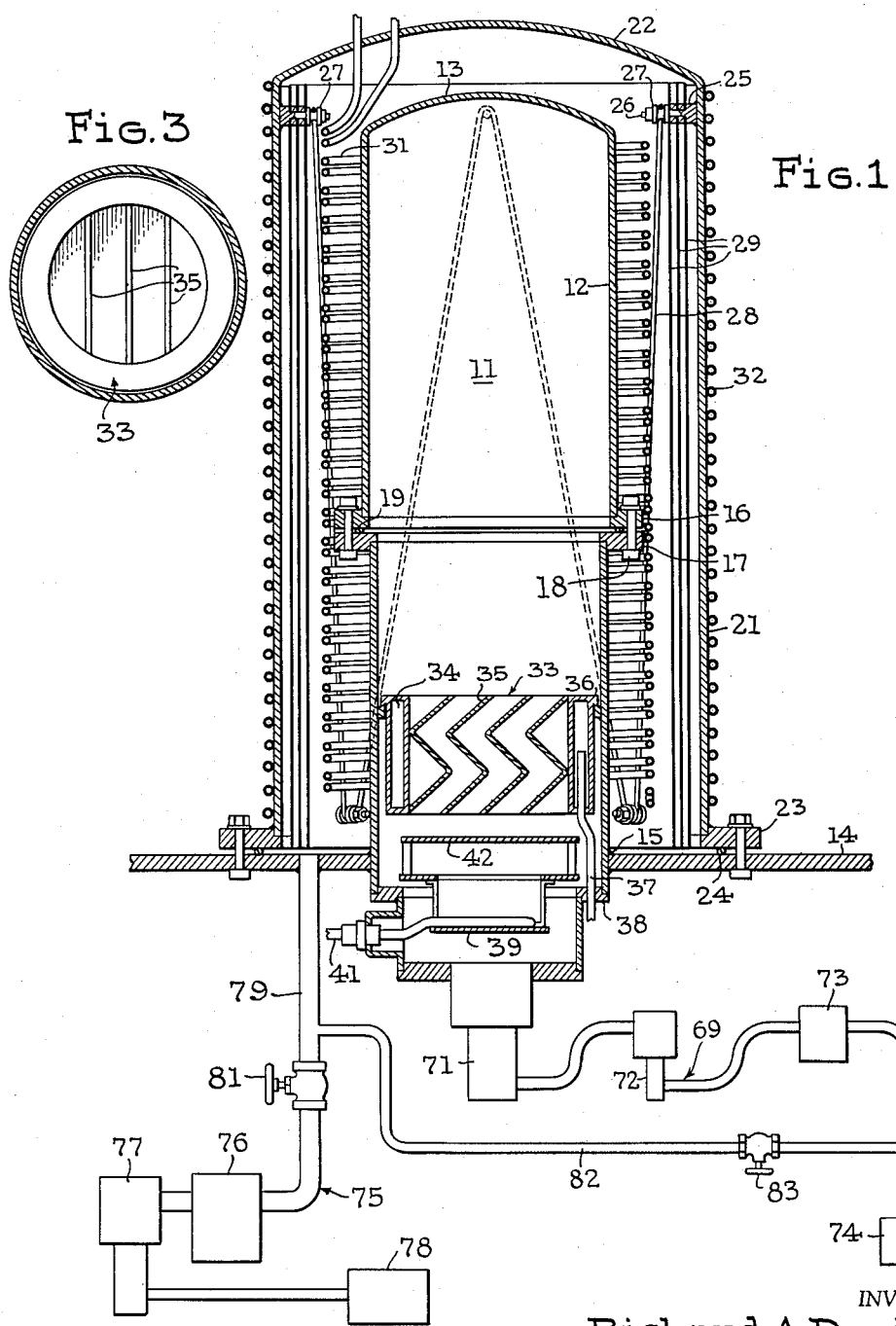
INVENTORS
Richard A. Denton
and Michael P. Rivera
BY *Dodge and Sons*
ATTORNEYS June 25, 1963 R. A. DENTON ET AL 3,095,494
ULTRA HIGH VACUUM DEVICE
Filed Feb. 25, 1960 2 Sheets-Sheet 2
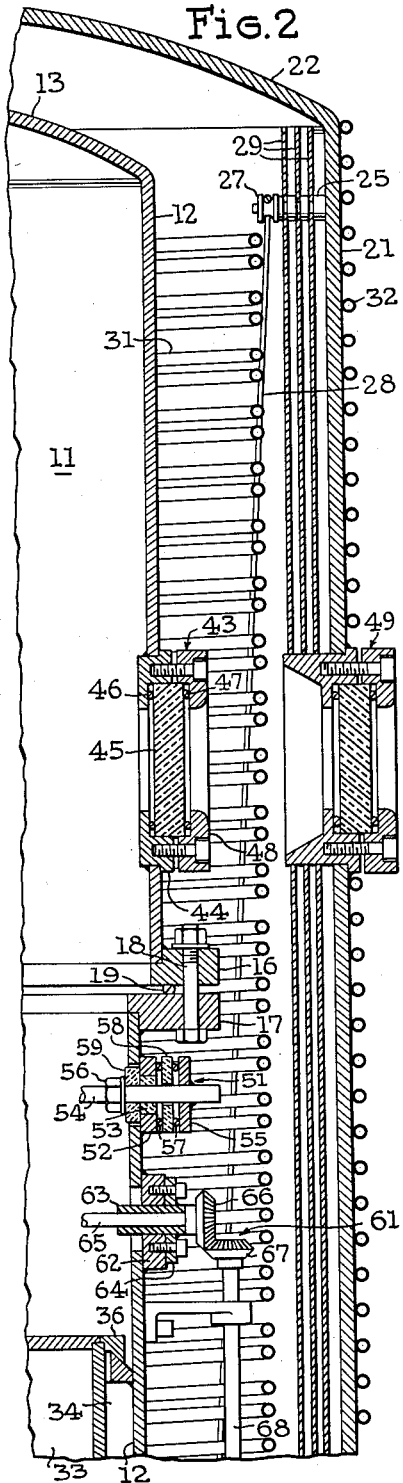
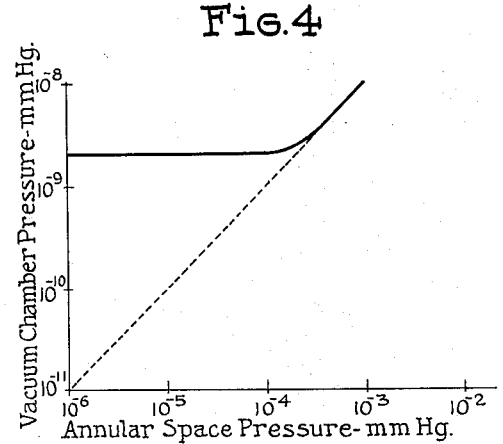
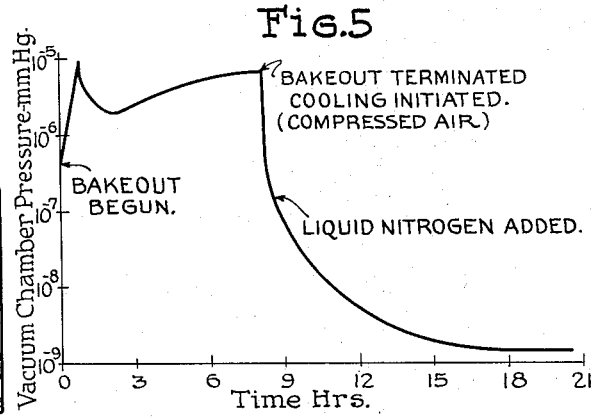
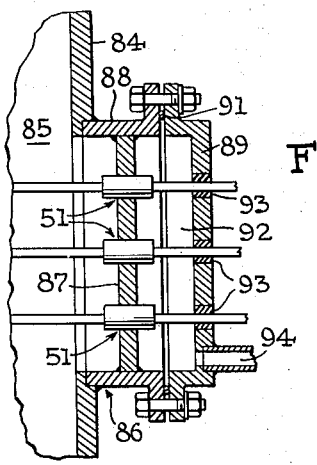
INVENTORS
Richard A. Denton
and Michael P. Rivera
BY *Dodge and Sons*
ATTORNEYS United States Patent Office 3,095,494
Patented June 25, 1963

3,095,494
ULTRA HIGH VACUUM DEVICE
Richard A. Denton, Haddonfield, N.J., and Michael P. Rivera, Palo Alto, Calif., assignors to The New York Air Brake Company, a corporation of New Jersey
Filed Feb. 25, 1960, Ser. No. 11,011
6 Claims. (Cl. 219—35)

This invention relates to ultra high vacuum systems. As used herein, the term "ultra high vacuum" means a pressure on the order of $1\times 10^{-9}$ mm. Hg.

In conventional ultra high vacuum systems, the vacuum chamber is defined by a casing whose inner side is subjected to the ultra high vacuum and whose outer side is subjected to atmospheric pressure. In order to establish an ultra high vacuum, it is necessary to heat the casing so that adsorbed gases are driven from its walls, and to reduce, to a very small value, the rate of leakage into the chamber from the atmosphere. Control of leakage is important in all high vacuum work but it is essential in ultra high vacuum systems. The truth of this will be apparent when one remembers that in an ultra high vacuum system operating at a pressure of $1\times 10^{-9}$ mm. Hg, the volume occupied by a given quantity of leakage gas is ten thousand times the volume occupied by that same quantity at a high vacuum of $1\times 10^{-5}$ mm. Hg. Since the pumping speeds of the vacuum pumps usually employed in ultra high vacuum work decrease, or at best remain constant, as pressure decreases, it is apparent that conventional ultra high vacuum systems must be practically leak-proof if ultimate pressures on the order of $1\times 10^{-9}$ mm. Hg are to be produced. This, of course, means that the system must be checked very carefully for leaks and that the most sensitive leak detection methods (e.g., helium mass spectrometer) must be used. In those systems, such as vacuum evaporators, which are opened to atmosphere and reclosed frequently, extensive leakage testing is required each cycle.

In normal high vacuum systems, gaskets of rubber and other elastomers are employed frequently and provide a rather easy means of making a leak-tight seal. This type of seal cannot be employed in an ultra high vacuum system first, because of the high temperatures (frequently above 400° to 500° C.) encountered during the bake out, and second, because of the outgassing characteristics of the elastomers, greases and paints used in them. While the virtual leakage attributable to elastomers, greases, etc., is acceptable under high vacuum conditions, it is intolerable at pressures on the order of $1\times 10^{-9}$ mm. Hg.

Some of the processes carried on within ultra high vacuum chambers, for example, coating by deposition of vaporized metal, require electrical energy. This necessitates the presence of electrical penetrations through the walls of the casing. As already mentioned, because of the pressure differential acting across the walls and the extreme temperatures encountered during the bake out, effective sealing of these penetrations presents a serious problem. Electrically insulated vacuum-tight seals can be made using glass to metal or ceramic to metal joints, but these seals are expensive and are difficult to work with at high temperatures. Furthermore, in many cases, it is desirable to produce mechanical movement, such as rotary motion, within the vacuum chamber. The industry has many sealed mechanical motions but all those which will transmit continuously a substantial torque through the chamber wall employ elastomer gaskets and vacuum greases.

The object of this invention is to provide an ultra high vacuum system in which the penetrations through the walls of the vacuum chamber do not require leak-proof seals.

This invention takes into account the fact that the ultimate pressure P established in the ultra high vacuum chamber is directly proportional to the mass rate of flow Q of gas into the chamber and inversely proportional to the rate S at which gas is removed from the chamber. This relationship is expressed by the equation $$P=\frac{Q}{S}$$

The object of the invention is accomplished by treating each of the quantities on the right-hand side of the equation. The first quantity, rate of evacuation S, must of necessity be relatively high because intentional leaks are an inherent characteristic of the invention. This requirement is satisfied in the preferred embodiment by employing a diffusion pumping system for evacuating the ultra high vacuum chamber.

The mass rate of flow Q is a more difficult quantity to treat. This quantity Q is made up of two parts, namely, the rate of evolution $Q_0$ of adsorbed gases from the walls of the vacuum chamber, and the rate of leakage $Q_L$ through the penetrations. The latter part $Q_L$ is the product of the sum of the individual conductances (or leakages) of the various penetrations multiplied by the pressure differential across the wall of the ultra high vacuum chamber. Since the purpose of this invention is to use seals permitting some leakage (because these are easier to fabricate, use and maintain than those which are absolutely leak-proof), accomplishment of the object requires a reduction in the pressure differential. This is done by enclosing the outer end of each penetration in a space which itself is evacuated to a pressure at least as low as $1\times 10^{-3}$ mm. Hg. The provision of this intermediate pumped volume minimizes leakage through the seals and diffusion of gas through the walls of the vacuum chamber. The rate of evolution $Q_0$ of adsorbed gases is reduced by providing means for heating the ultra high vacuum chamber.

In the last analysis, the invention attacks the problem of providing easily useable sealed penetrations for an ultra high vacuum chamber by using several devices whose effects are coordinated and which introduce no problems of their own that are more troublesome than the very one which the invention was conceived to solve. The manner in which the vacuum chamber is evacuated is conventional but when correlated with the manner in which the rate of leakage $Q_L$ is treated, it is adequate. The space surrounding each penetration can be sealed with conventional elastomer gaskets and evacuated simply and routinely to a pressure low enough to permit the use of seals for the vacuum chamber which are readily fabricated from materials having acceptable high temperature and gassing characteristics. And finally, the rate of evolution $Q_0$ is kept within acceptable limits by use of a reasonable baking cycle. While these expedients, by themselves, are simple, they cooperate to produce a useful and practical ultra high vacuum chamber in a surprisingly routine fashion.

The preferred embodiment of the invention will now be described in detail with reference to the accompanying drawings, in which:

FIG. 1 is an axial sectional view of the vacuum chamber and the surrounding casing showing, in schematic form, the diffusion pumping systems employed to evacuate them.

FIG. 2 is an enlarged view of a portion of the inner and outer casings shown in FIG. 1; this figure showing typical penetrations.

FIG. 3 is a plan view of the liquid nitrogen vapor trap.

FIG. 4 is a log log graph of pressure in the vacuum chamber versus pressure in the annular space between the two casings.

FIG. 5 is a semi log graph showing the relationship between vacuum chamber pressure and time during the operating cycle.

FIG. 6 is a view of a modified form of the invention useful with vacuum chambers of large size.

As shown in FIG. 1, the vacuum chamber 11 is enclosed by a cylindrical casing 12 whose upper end is closed by a curved dome 13. This inner casing 12 is supported by a base plate 14 to which it is joined by a welded joint 15. The casing 12 has two separable sections which carry mating flanges 16 and 17 whose mating surfaces are flat and smooth. These flanges are connected together by bolts 18 and the joint is sealed by a ring 19 of copper wire. This is a conventional wire seal.

Enclosing the inner casing 12 is an outer coaxial cylindrical casing 21 having a curved dome 22 at its upper end similar to the dome 13 of casing 12. The outer casing 21 is provided, at its lower end, with a flange 23 that is bolted to the base plate 14. This joint is sealed by an elastic O-ring 24. Elastomers may be used in this region because, as will appear below, this portion of the system is not baked.

Two series of tapped blocks 25 (only the upper series being shown) are spaced around the inner periphery of casing 21 near its upper and lower ends. These blocks are welded to the casing. Threaded into the blocks 25 are studs 26 which, at their innermost ends, support grooved guides 27. A continuous length of Nichrome wire 28 is looped over and around the guides 27 in serpentine fashion and this wire filament is the heater used to bake the inner casing 12. The opposite ends of the Nichrome wire 28 pass into the annular space between the inner and outer casings through conventional seals (not shown) located in base plate 14. Studs 26 also support three spaced cylindrical stainless steel radiation shields 29. These shields 29 minimize heating of the outer casing 21 during the baking operation and thus conserve energy.

Attached to the curved dome 22 of the outer casing is a helically coiled tube 31 which encircles the inner casing 12 and extends for substantially the entire length of this casing. Coil 31 is a conduit for a heat exchange medium, in one case air and later water, which cools the apparatus after the baking operation. It has been found that this means of cooling is necessary in order to afford an operating cycle of acceptable duration. A similar heat exchange tube 32 is brazed to the outer periphery of the casing 21 and serves further to cool the apparatus.

In the lower of the two sections of casing 12 is a liquid nitrogen trap 33 of the chevron type. This trap comprises two coaxial cylindrical copper walls whose upper and lower ends are closed to define an annular liquid nitrogen chamber 34. Located in the central opening of the trap are a plurality of copper baffles 35. The trap is nickel plated. The outer wall of the trap is provided with an annular flange 36 which seats on a similar flange that is welded to the inner casing 12. Extending into the nitrogen chamber 34 is a fill pipe 37 which passes through and is sealed in a closure plate 38 located at the lower end of the inner casing 12. A similar overflow pipe (not shown) is also provided. A water-cooled baffle 39 is located below the chevron trap 33 and is provided with inlet and outlet connections 41 (only one being shown). This water baffle supports a radiation shield 42 which is located just below the lower edge of the chevron trap.

The preferred embodiment of the invention is an evaporator, and therefore it is necessary to provide certain penetrations through the wall of the casing 12. Each of these penetrations employs conventional wire seals, and the conductances of these seals are so selected that the leakage through them does not preclude establishment of an ultra high vacuum. As shown in FIG. 2, the sight port penetration 43 includes an annular base member 44 which is welded to the wall of casing 12 and is provided with a counterbore that receives the glass window 45. Between the window 45 and the flange on base member 44 is located the copper wire sealing ring 46. On the opposite face of the window 45 is positioned an aluminum wire back-up ring 47 which is pressed into engagement with the glass by means of an annular clamping member 48. In line with the sight port 43 is a similar port 49 mounted in the wall of the outer casing 21.

The electrode penetration 51 comprises a stainless steel bushing 52 which is welded to the wall of the inner casing 12 and is provided with a ceramic insulating insert 53. A copper rod conductor or electrode 54 passes through this sleeve and is provided with an integral flange 55. The conductor rod 54 is threaded to receive a nut 56. Positioned between the flange 55 and the bushing 52 are a pair of copper wire sealing rings 57 located on opposite sides of a ceramic washer 58. Another ceramic washer 59 is positioned between the nut 56 and the bushing 52. When the nut 56 is tightened, the flange 55 is forced to the left thereby compressing the copper wire seals 57 and effectively sealing the penetration. It will be understood, however, that, like the other copper wire seals, this is not an absolute seal and that some leakage does occur.

The rotary motion penetration 61 comprises a stainless steel bushing 62 that is welded to the wall of the inner casing 12 and receives a sleeve 63. The sleeve 63 is brazed to a plate 64 that is bolted to the bushing 62. A rotary shaft 65 passes through the sleeve 63 and carries, at its outer end, a bevel gear 66 which mates with a similar gear 67 carried by the vertical shaft 68. The shaft 68 passes through conventional seals (not shown) in the base plate 14 to an electric motor (not shown) located outside the apparatus.

The electrode penetration 51 and the rotary motion penetration 61 are used in the coating by deposition of vaporized metal process which is well known. Therefore, the details of the mechanism associated with these parts have been omitted.

Chamber 11 is evacuated by a diffusion pumping system 69 which comprises, in series, the chevron trap 33, two diffusion pumps 71 and 72, a cold vapor trap 73, and a mechanical fore pump 74. In a typical installation, where the vacuum chamber 11 is 12 inches in diameter and 18 inches long, diffusion pump 71 is a 6 inch pump, and a 2 inch pump is employed for the diffusion pump 72. The mechanical fore pump 74 has a capacity of about 15 cubic feet per minute. Chevron trap 33 is an essential part of this system because it not only prevents backstreaming pumping vapors from reaching chamber 11 but also condenses the condensable vapors present in that chamber. Without this or an equivalent trap, an ultra high vacuum could not be established in chamber 11.

The annular space between the casings 12 and 21 is evacuated by a second diffusion pumping system 75 which includes a cold trap 76, a 4 inch diffusion pump 77, and a mechanical fore pump 78. The vacuum line 79, of the diffusion pumping system 75, is provided with a shut-off valve 81 and with a cross-over line 82 which communicates with the diffusion pumping system 69. The cross-over line 82 is provided with a shut-off valve 83 and is used during the rough pumping operation so that both the vacuum chamber 11 and the annular space between the two casings may be roughed-down by the same mechanical fore pump.

Operation

Prior to operation, it is desirable to make a rough estimate of the rate of leakage through the walls and penetrations of the inner casing 12. This is accomplished by operating the mechanical pump 74 with the shut-off valve 83 closed and the outer casing 21 removed so that a pressure of about .1 to .5 mm. Hg is established in the vacuum chamber 11 while the outer side of casing 12 is subjected to atmospheric pressure. If this pressure of .1 to .5 mm. Hg can be held in the vacuum chamber 11, then experience shows that the likelihood of establishing an ultra high vacuum is good. If this condition is not satisfied, the seals at the penetrations are rechecked for faulty installation. The source of leakage can be located simply by spraying the joints and penetrations with acetone and noting the reading of the vacuum gauge (not shown) that is connected with the vacuum chamber. Super-sensitive mass spectrometer testing is not required.

If the test requirement is satisfied, the outer casing 21 is installed and the valve 83 is opened so that the annular space between the casings may be evacuated. After a rough vacuum has been established in this space, valve 83 is closed and simultaneously pumps 77 and 78 are started and valve 81 is opened. At this time, the diffusion pumps 71 and 72 are started and electric current is fed to the Nichrome filament 28. The filament current is so adjusted that casing 12 reaches an equilibrium temperature of 490° C. The baking operation takes about eight hours, and FIG. 5 shows a typical history of the pressure in vacuum chamber 11 as this operation proceeds. During this process, pressure in the annular space between the casings rises to about $9 \times 10^{-5}$ mm. Hg and then falls gradually to a final pressure of $3 \times 10^{-6}$ mm. Hg.

At the end of the baking cycle, compressed air is blown through the chevron trap 33 and the heat exchange coils 31 and 32. This action produces a moderate pre-cooling and is followed by charging the chevron trap 33 with liquid nitrogen and by circulating water through the tubes 31 and 32 and the water baffle 39. As shown in FIG. 5, a pressure of about 1 to $2 \times 10^{-9}$ mm. Hg is established after eight hours of cooling. In operation, it has been found that this pressure can be held for periods of at least eight hours while coating or other processes were carried on within vacuum chamber 11.

In designing this system, it is necessary to calculate the conductance of the leak path of each penetration (including each joint between separable sections of the inner casing, such as the joint between flanges 16 and 17), add the results, and correlate the sum with the pumping speed S of the diffusion pumping system 69, the rate of evolution $Q_0$ and the pressure which will prevail in the annular space between casings 12 and 21. The goal of this process of analysis is to achieve an ultra high vacuum without resorting to the use of leak-proof seals capable of being baked.

FIG. 4 illustrates the relationship between the pressure in vacuum chamber 11 and the pressure in the annular space between the casings 12 and 21. This curve is based on experimental data and shows that, for one embodiment, below an annular space pressure of about $10^{-4}$ mm. Hg, the pressure in vacuum chamber 11 is independent of the pressure in the annular space. The break in the solid line portion of FIG. 4 is the point at which the rate of leakage $Q_L$ through the sealed penetrations (including the joint between flanges 16 and 17) becomes insignificantly small compared to the rate of evolution $Q_0$ of adsorbed gases from the walls of casing 12. If the walls of the inner chamber 12 were gas free, then, according to the extrapolation of the curve of FIG. 4, the rate of leakage $Q_L$ in this embodiment would limit the vacuum which could be established in the vacuum chamber 11 to about $1 \times 10^{-11}$ mm. Hg. The graph of FIG. 4 shows quite clearly that this invention does produce ultra high vacuum without the use of leak-proof seals and without introducing other equipment which is just as difficult to install and to operate.

The embodiment of FIGS. 1–5 is satisfactory when relatively small vacuum chambers are contemplated. However, in the case of large chambers having diameters on the order of 10 feet and lengths of about 20 feet, it may be impractical to surround the whole vacuum chamber with an annular space such as the space between casings 12 and 21 in the embodiment just described. The FIG. 6 embodiment is useful in this instance. As shown in FIG. 6, the casing 84, which encloses the vacuum chamber 85, is on the order of about 10 feet in diameter. In this installation, which shows three penetrations 51 such as those employed in FIG. 2, the sealed penetrations are all grouped together into a single penetration 86. The penetrations 51 pass through a wall 87 which is welded to a bushing member 88 which, in turn, is welded to the wall of the casing 84. A closure cap 89, which is bolted to the bushing 88 and sealed by means of a copper wire seal 91, encloses the space 92 that surrounds the outer portions of the penetrations 51. Conventional seals, indicated at 93, can be employed where the electrodes 54 pass through the cover member 89. A port 94 is provided in the cover 89 for evacuating the space 93 by means of a diffusion pumping system such as the system 75 illustrated in FIG. 1.

It will be understood that the curve of FIG. 4 represents one typical curve of a family curves characteristic of this invention. If the embodiment under test had a lower leakage rate $Q_L$ (by reason of having fewer penetrations or penetrations with lower conductances), the pressure curve would be parallel with the curve of FIG. 4 but displaced to the right of that curve. If the test embodiment has a higher leakage rate $Q_L$, the pressure curve moves to the left of the FIG. 4 curve.

It also should be mentioned that wire seals, such as those employed in the illustrated embodiments of this invention, may, as a result of differential expansion, open slightly when baked at high temperature. In a conventional ultra high vacuum system this action could be disastrous, but with the differentially pumped system provided by this invention the effect is usually insignificant.

From the preceding description, it will be apparent that the present invention affords a vacuum chamber which can be opened and closed readily, and yet, a chamber affords pressures on the order $1 \times 10^{-9}$ mm. Hg. In addition, it will be observed that this invention makes possible the use of a rotary motion 61 that is capable of transmitting continuously a substantial torque through the wall of the inner casing.

As stated previously, the drawings and description relate only to a preferred embodiment of the invention. Since many changes can be made in the structure of this embodiment without departing from the inventive concept, the following claims should provide the sole measure of the scope of the invention.

What is claimed is:

1. In combination, an inner casing enclosing a vacuum chamber having an outlet port; at least one penetration through the wall of the inner casing; a nonhermetic, bakeable seal for each penetration; means for heating the inner casing; an outer casing enclosing a space surrounding each sealed penetration; a first pumping system capable of operating at pressures at least as low as $1 \times 10^{-9}$ mm. Hg and connected with the outlet port for evacuating the vacuum chamber; and a second pumping system connected with the space enclosed by the outer casing for avacuating it to a pressure at least as low as $1 \times 10^{-3}$ mm. Hg, each sealed penetration providing a leakage path whose conductance is correlated with the pumping speed of the first pumping system, the rate of evolution of adsorbed gases from the walls of the inner casing and the pressure in the space enclosed by the outer casing.

2. The combination defined in claim 1 in which the first pumping system includes in series a pumping vapor trap, at least one diffusion pump and a mechanical fore pump.

3. The combination defined in claim 2 in which the conductance of each leakage path is such that the rate of leakage is small compared with the rate of evolutation of adsorbed gases.

4. The combination defined in claim 2 in which the two casings have coaxial cylindrical walls spaced radially from each other; in which the pumping vapor trap is a cold trap located within the inner casing between the outlet port and the sealed penetrations; and in which the means for heating the inner casing comprises an electrical heater element which is located in the annular space between the cylindrical walls of the inner and outer casings.

5. The combination defined in claim 4 including a cylindrical radiation shield located in the space between the cylindrical walls of the two casings and positioned between the heater element and the outer casing.

6. The combination defined in claim 5 including a coiled heat exchange tube encircling the inner casing and located between that casing and the electrical heater element, and means for leading heat exchange medium into and out of the heat exchange tube.

References Cited in the file of this patent

UNITED STATES PATENTS

| | | |
|---|---|---|
| 2,476,916 | Rose et al. | July 19, 1949 |
| 2,678,958 | Hintenberger | May 18, 1954 |
| 2,789,153 | Mark | Apr. 16, 1957 |
| 2,915,384 | Walsh | Dec. 1, 1959 |
| 3,018,561 | Wells | Jan. 30, 1962 |